(12) United States Patent
Kamata

(10) Patent No.: US 8,706,868 B2
(45) Date of Patent: Apr. 22, 2014

(54) IMAGE PROCESSING APPARATUS, INFORMATION PROCESSING APPARATUS, AND METHOD THEREFOR

(75) Inventor: Tamaki Kamata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 13/108,886

(22) Filed: May 16, 2011

(65) Prior Publication Data
US 2011/0296008 A1    Dec. 1, 2011

(30) Foreign Application Priority Data
May 25, 2010    (JP) .................................. 2010-119626

(51) Int. Cl.
G06F 15/173    (2006.01)
(52) U.S. Cl.
USPC ............................................................. 709/224
(58) Field of Classification Search
USPC ............................................................. 709/224
See application file for complete search history.

(56) References Cited

U.S. PATENT DOCUMENTS

| | | | |
|---|---|---|---|
| 6,288,790 B1 | 9/2001 | Yellepeddy | |
| 6,370,341 B1 | 4/2002 | Haines | |
| 6,430,711 B1 | 8/2002 | Sekizawa | |
| 2004/0212818 A1 | 10/2004 | Harada | |
| 2005/0049837 A1 | 3/2005 | Reese | |
| 2009/0237725 A1* | 9/2009 | Hamaguchi | 358/1.15 |

FOREIGN PATENT DOCUMENTS

| | | |
|---|---|---|
| CN | 1517866 A | 8/2004 |
| CN | 1731387 A | 2/2006 |
| CN | 1758239 A | 4/2006 |
| JP | 2002-189639 A | 7/2002 |
| JP | 2004-088570 A | 3/2004 |
| JP | 2004-288193 A | 10/2004 |
| JP | 2009-187070A A | 8/2009 |
| JP | 2009-225316 A | 10/2009 |

* cited by examiner

Primary Examiner — Mark Rinehart
Assistant Examiner — Ellen A Kirillova
(74) Attorney, Agent, or Firm — Canon USA, Inc., IP Division

(57) ABSTRACT

An image processing apparatus capable of requesting a service providing apparatus via an external network to perform processing and communicating with an information processing apparatus via an internal network includes an activation unit configured to activate a check unit configured to check a status of the processing acquired by the information processing apparatus, a stopping unit configured to stop the check unit if the check unit activated by the activation unit recognizes that the status of the processing is not a stopped state, and a request unit configured to request the service providing apparatus to perform the processing if the check unit is stopped.

12 Claims, 11 Drawing Sheets

FIG.9

| SERVICE SERVER ID 901 | APPLICATION ID 902 | APPLICATION NAME 903 | STATUS 904 | EXPECTED RECOVERY TIME 905 | URL 906 | AUTHENTICATION ID 907 | PASSWORD 908 |
|---|---|---|---|---|---|---|---|
| S913 | 001 | FILE CONVERSION 1 | FAILURE RECOVERY OPERATION IN PROGRESS | RECOVERY UNDETERMINED | https://aaa.com/aa/bbb?ccc | admin | ******* |
| S913 | 004 | IMAGE PROCESSING 2 | MAINTENANCE OPERATION IN PROGRESS | 2010/03/01 13:00:00 | https://aaa.com/bb/yyy?cc | admin | ****** |
| S728 | 304 | IMAGE PROCESSING A | MAINTENANCE OPERATION IN PROGRESS | 2010/03/01 18:00:00 | https://xxx.co.jp/xx/check.do | user00 | ****** |
| ... | ... | ... | ... | ... | ... | ... | ... |

| 1000 | 1001 | 1002 | 1003 | 1004 | 1005 |
|---|---|---|---|---|---|
| | DEVICE ID | MODEL NAME | USABILITY STATUS | INSTALLATION SITE | RECOVERY CHECK APPLICATION STATUS |
| | 10301 | iR3035 | OFFLINE | KOSUGI MAIN BUILDING, MEETING ROOM 1 (1ST FLOOR) | BEING ACTIVATED |
| | 25002 | iR3880 | READY | KOSUGI MAIN BUILDING, MEETING ROOM 2 (1ST FLOOR) | BEING ACTIVATED |
| | 19184 | iR-ADV C5045 | READY | KOSUGI MAIN BUILDING, LABORATORY 1 (2ND FLOOR) | NOT ACTIVATED |
| | 13807 | iR-ADV C5030 | READY | KOSUGI MAIN BUILDING, OFFICE ROOM 2 (3RD FLOOR) | NOT ACTIVATED |
| | ... | ... | ... | ... | ... |

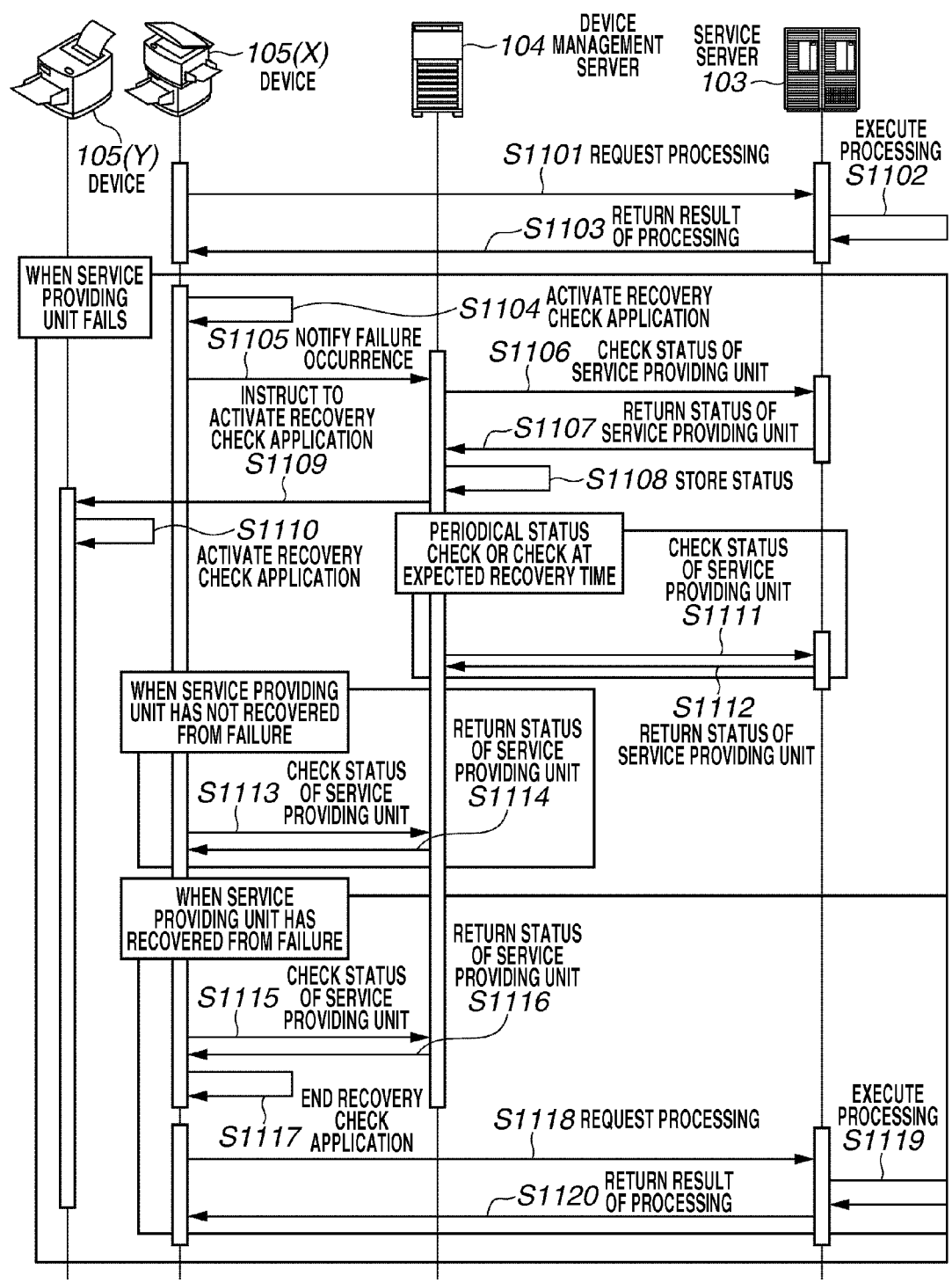

IMAGE PROCESSING APPARATUS, INFORMATION PROCESSING APPARATUS, AND METHOD THEREFOR

BACKGROUND OF THE INVENTION

1. Field of the Invention

The present invention relates to a technique for controlling communication between a service providing apparatus on an external network and an image processing apparatus on an internal network.

2. Description of the Related Art

Recently, the addition of various functions to devices such as multifunction peripherals (MFPs) has been progressed and software-based processing such as image processing can be performed in such devices. However, the software-based processing largely affects the performance of other functions of the device, and installation and information setting procedures for using software are troublesome.

A system capable of requesting an application service provided by an application service server (hereinafter referred to as service server) on the Internet to perform high-load processing and processing of functions not included in a device has been discussed (for example, Japanese patent application Laid-Open No. 2004-088570).

In this case, the device requests an application service on the service server to perform specific processing, the application service being used by the device. In the event that a failure occurs, the device inquires of the service server or service application for when the failure is fixed or whether it has already been fixed. In this case, each individual device transmits a request to the application service on the Internet.

Therefore, the application service has to return an error message notifying the fact that a failure occurred to each individual device which transmitted the request. Thus, this configuration has an issue of excessive access and excessive communication on the Internet.

SUMMARY OF THE INVENTION

According to an aspect of the present invention, an image processing apparatus capable of requesting a service providing apparatus via an external network to perform processing and communicating with an information processing apparatus via an internal network includes an activation unit configured to activate a check unit configured to check a status of the processing acquired by the information processing apparatus, a stopping unit configured to stop the check unit if the check unit activated by the activation unit recognizes that the status of the processing is not a stopped state, and a request unit configured to request the service providing apparatus to perform the processing if the check unit is stopped.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an exemplary configuration of a table.

FIG. 10 illustrates an exemplary configuration of a table.

FIG. 11 is an exemplary flow chart illustrating a series of processing performed between apparatuses.

DESCRIPTION OF THE EMBODIMENTS

Various exemplary embodiments, features, and aspects of the invention will be described in detail below with reference to the drawings.

Figure 1:
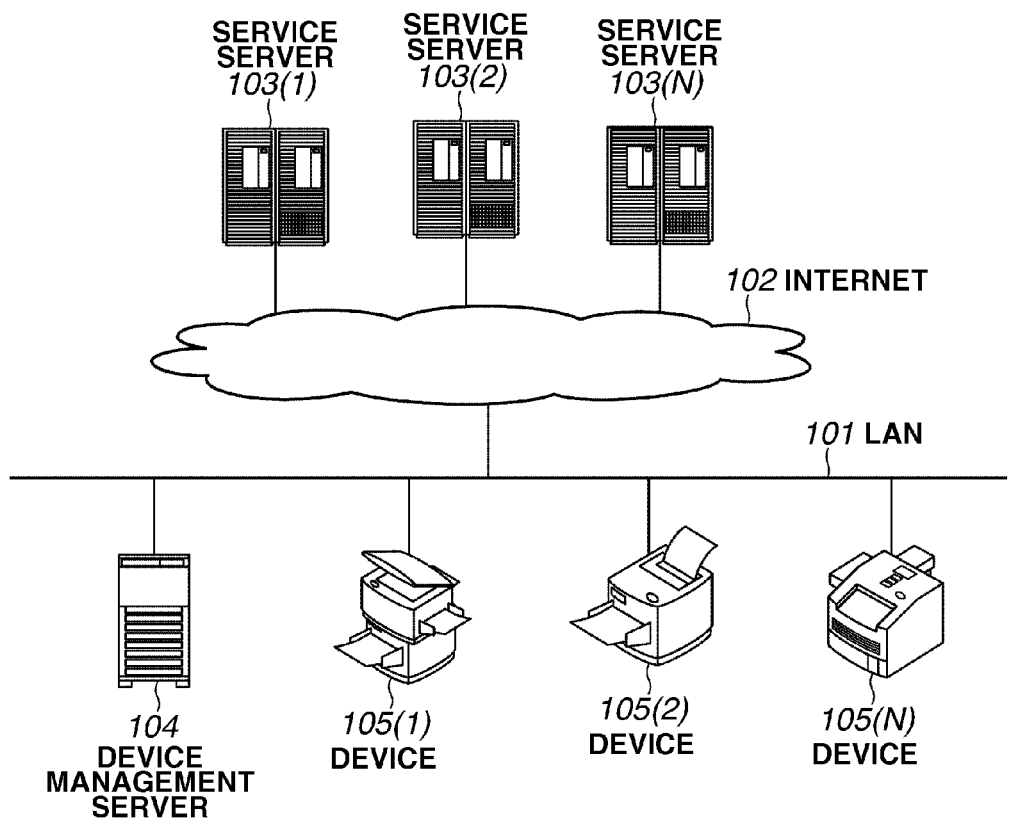
FIG. 1 illustrates an exemplary configuration of a failure monitoring system.

FIG. 1 illustrates an exemplary configuration of a failure monitoring system according to a first exemplary embodiment. The failure monitoring system is an example of a communication control system and includes service servers 103 (1) to 103(N), a device management server 104, and devices 105(1) to 105(N).

In the present exemplary embodiment, for convenience of description, any one or all of the service servers 103(1) to 103(N) will be simply referred to as service server 103. On the other hand, a specific service server will be referred to as the service server 103(X), the service server 103(Y), etc. Likewise, for convenience of description, any one or all of the devices 105(1) to 105(N) will be simply referred to as device 105. On the other hand, a specific device will be referred to as the device 105(X), the device 105(Y), etc.

The device management server 104 and the device 105 are communicably connected with each other via a local area network (LAN) 101, which is an example of an internal network. Further, the device management server 104 and the device 105 are communicably connected to the service server 103 via the Internet 102, which is an example of an external network.

The service server 103, which is an example of an information processing apparatus (computer), communicates with the device management server 104 and the device 105 to receive various types of requests transmitted from the device management server 104 and the device 105 via the Internet 102. The service server 103 performs processing according to these requests.

The device management server 104, which is an example of an information processing apparatus (computer), manages information about usability status, installation site of the device 105, etc., and receives from the device 105 a notification about the failure occurrence in the service server 103 (failure occurrence notification). Upon reception of the failure occurrence notification, the device management server 104 instructs the device 105(Y) other than the device 105(X) which transmitted the failure occurrence notification to activate a recovery check application, which is described below.

The device 105, which is an example of an image processing apparatus, may include a printer, a facsimile, or a multifunction peripheral having a scanning and transmission function, a printing function, a function of connecting to the Internet 102, and so on. In the present exemplary embodiment, if a failure occurs in an application service on the Internet 102 (i.e. cloud), the device management server 104 in the LAN 101 monitors the failure on behalf of all of the apparatuses. Thus, a plurality of the devices 105 using the application service do not need to monitor it. The device management server 104 also instructs the device 105 under management thereof to activate the recovery check application (a check application for preventing direct inquiry to the application service).

Figure 2:
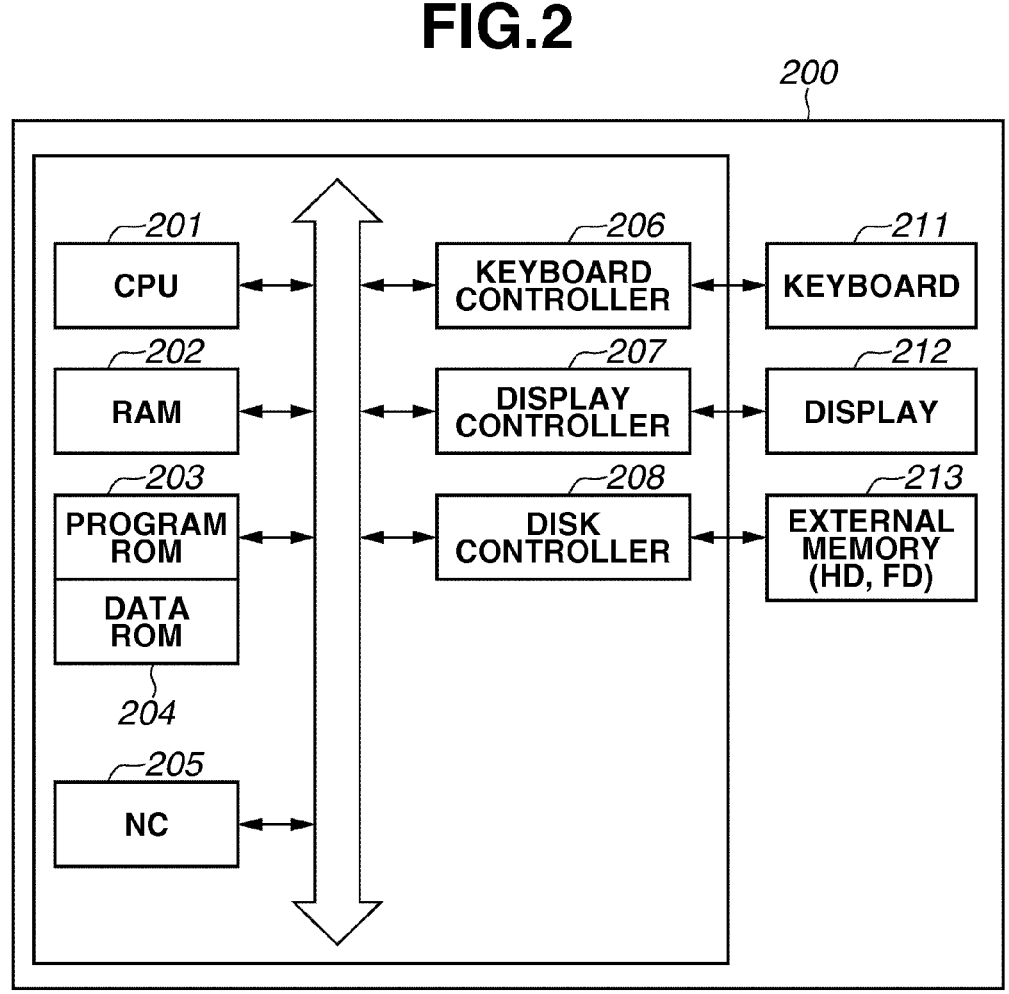
FIG. 2 illustrates an exemplary hardware configuration of a server.

FIG. 2 illustrates an exemplary hardware configuration of a server 200 (the service server 103 and the device management server 104). The server 200 can employ a hardware configuration of a generally-used information processing apparatus.

A central processing unit (CPU) 201 manages calculation and control of the server 200. A random access memory (RAM) 202 serves as a main memory of the CPU 201, for example, an execution area for various programs and data area. Various programs are loaded from an external memory 213 into the RAM 202 and then executed by the CPU 201.

A program read-only memory (ROM) 203 stores programs of an operating system (OS) which controls the server 200. For example, in the service server 103, the program. ROM 203 stores programs related to a service application for providing a service for performing processing requested by the device 105.

A data ROM 204 stores necessary information for operating the server 200. For example, in the device management server 104, information necessary to operate the server 200 includes, for example, information about a usability status, an installation site, and the like of the device 105 managed by the device management server 104. The external memory 213 may be used instead of the data ROM 204.

A network controller (NC) 205 is connected to a network (such as the LAN 101) to control communication with other apparatuses connected to the network. A keyboard controller 206 controls a key input from a keyboard 211. A display controller 207 rasterizes image data to display the information in the server 200 on a screen of a display 212, and controls the display. In the device management server 104, a disk controller 208 controls, for example, a input and output of information about the usability status, the installation site, and the like of the device 105 managed by the device management server 104, to/from the external memory 213.

The keyboard 211 is an apparatus for enabling an administrator managing the server 200 to perform an input operation. For example, if a failure occurs in the service server 103, the administrator operates the keyboard 211 with reference to information displayed on the display 212 to perform a recovery operation. The display 212 is, for example, a liquid crystal display (LCD). The external memory (a hard disk (HD) or a flexible disk (FD)) 213 stores various types of data such as application-related programs.

In the present exemplary embodiment, the CPU 201 of the service server 103 executes processing according to procedures of a program stored in the external memory 213, thus a function of the service server 103 and processing illustrated in a flow chart described below can be achieved. Further, the CPU 201 of the device management server 104 executes processing according to procedures of a program stored in the external memory 213, thus a function of the device management server 104 and processing illustrated in a flow chart described below can be achieved.

The hardware configuration of the server 200 is not limited to the above-described hardware configuration. The server 200 can have an arbitrary configuration as required. For example, the device management server 104 does not necessarily include the keyboard 211 and the display 212.

Figure 3:
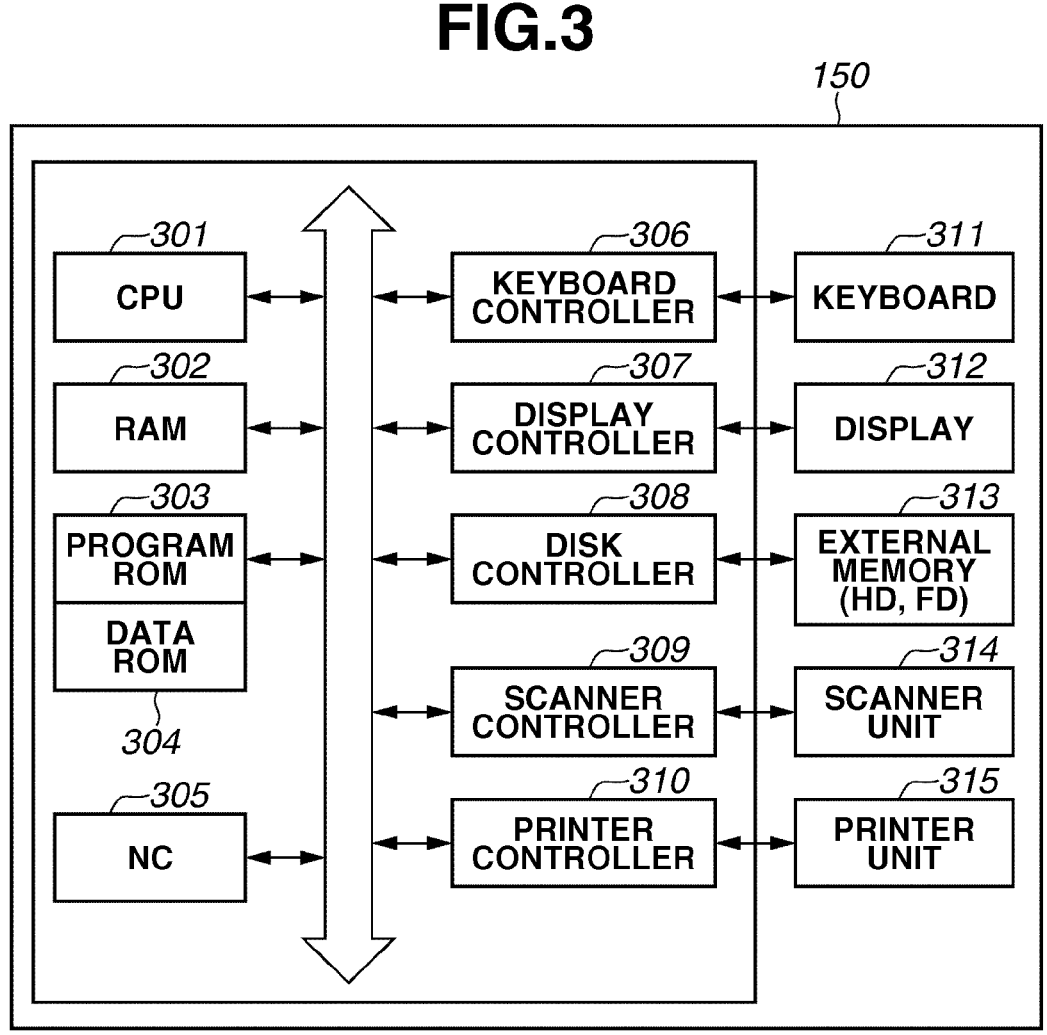
FIG. 3 illustrates an exemplary hardware configuration of a device.

FIG. 3 illustrates an exemplary hardware configuration of the device 105. For configurations similar to the one illustrated in FIG. 2, descriptions will be omitted. A CPU 301, a RAM 302, and a program ROM 303 are similar to the CPU 201, the RAM 202, and the program ROM 203 respectively. However, the program ROM 303 stores programs related to an application which requests the service server 103 to perform processing.

Further, for example, the program ROM 303 stores programs related to a recovery check application for checking the status of the service server 103 via the device management server 104 if a failure occurs in the service server 103. A data ROM 304, an NC 305, and a keyboard controller 306 are similar to the data ROM 204, the NC 205, and the keyboard controller 206 respectively. A display controller 307 and a disk controller 308 are similar to the display controller 207 and the disk controller 208 respectively.

A scanner controller 309 controls image data to be generated by a scanner unit 314 scanning a paper document. A printer controller 310 rasterizes information in the device 105 and information received via the LAN 101 and the Internet 102 into image data for printing, and performs control for printing the image data on paper by a printer unit 315. A keyboard 311, a display 312, and an external memory 313 are similar to the keyboard 211, the display 212, and the external memory 213 respectively.

The scanner unit 314 is a scanner apparatus used by a user of the device 105 to scan a paper document. The printer unit 315 is a printer apparatus used by the user of the device 105 to print information in the device 105 and information received via the LAN 101 and the Internet 102.

The hardware configuration of the device 105 is not limited to the above-described hardware configuration. The device 105 can have an arbitrary configuration as required. For example, the device 105 does not need to include the printer unit 315.

Figure 4:
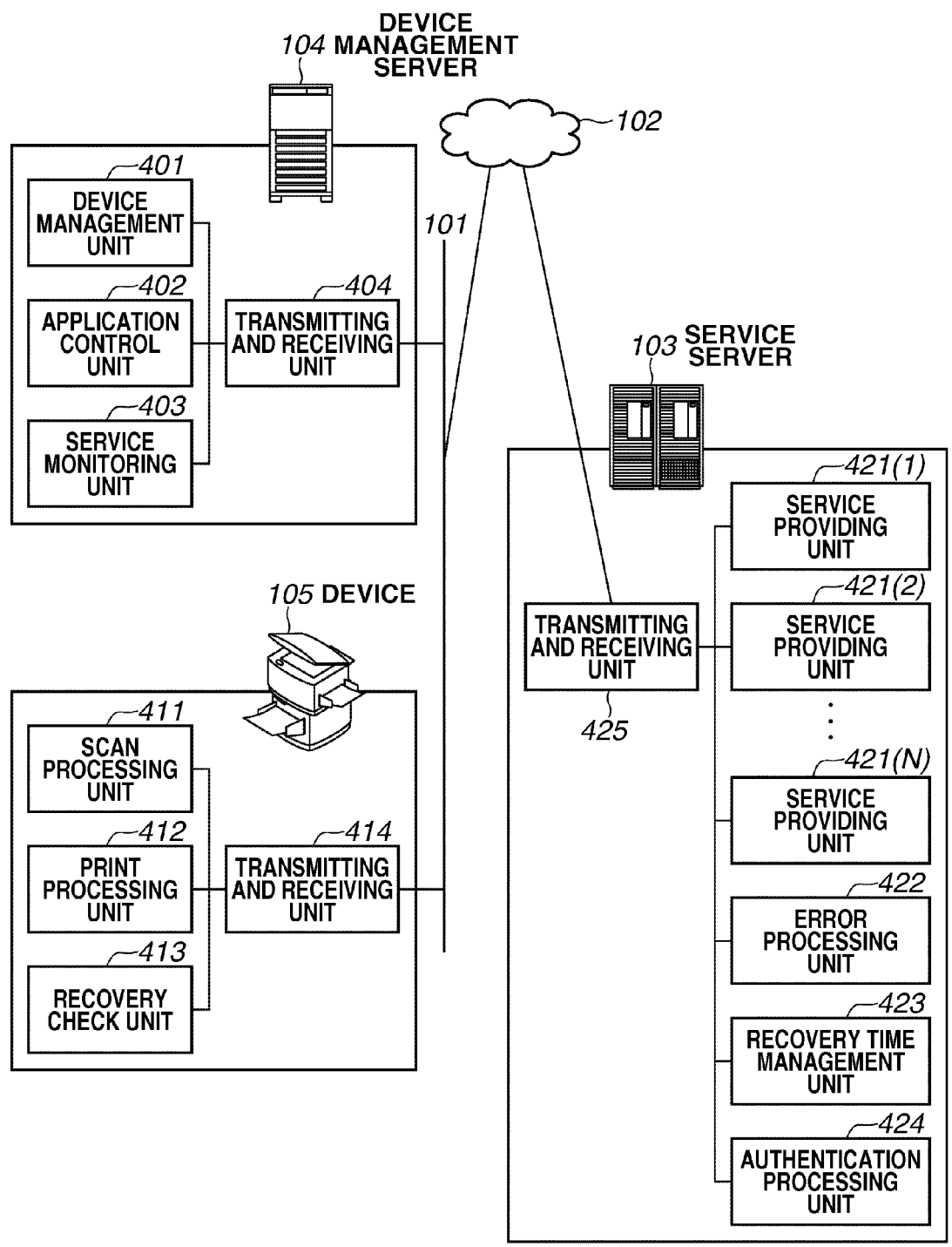
FIG. 4 illustrates an exemplary functional configuration of servers and a device.

FIG. 4 illustrates an exemplary functional configuration of the service server 103, the device management server 104, and the device 105.

A device management unit 401 in the device management server 104 manages information about the usability status, the installation site, and the like of all of the devices 105 under the management of the device management server 104 (for example, manages data using a device management table 1000 illustrated in FIG. 10). An application control unit 402 instructs the device 105 under the management of the device management unit 401 to activate and close the recovery check application. When determining whether the service application has recovered from a failure, etc., a service monitoring unit 403 of the device management server 104 checks the status of the service server 103. A transmitting and receiving unit 404 of the device management server 104 communicates with apparatuses on the network via the LAN 101 and the Internet 102.

A scan processing unit 411 of the device 105 scans paper using the scanner unit 314 and generates image data. The scan processing unit 411 is provided when the device 105 has a scanning function. A print processing unit 412 of the device 105 rasterizes information in the device 105 and information received via the LAN 101 and the Internet 102 into image data to be printed by the printer unit 315, and transmits the image data to the printer unit 315. The print processing unit 412 is provided when the device 105 includes a printing function.

A recovery check unit 413 of the device 105 is an exemplary function achieved by the recovery check application.

The recovery check application is installed in all of the devices 105 under the management of the device management server 104. The recovery check application is activated when the device 105 requests a service providing unit 421 of the service server 103 to perform processing and then a failure occurs and the device 105 receives from the device management server 104 an instruction to activate the recovery check application. The recovery check application is not constantly activated on the device 105. A transmitting and receiving unit 414 of the device 105 communicates with apparatuses on the network via the LAN 101 and the Internet 102.

Although, in the present exemplary embodiment, all of the devices 105 under the management of the device management server 104 include the recovery check application for convenience of description, the configuration is not limited thereto. For example, devices under the management of the device management server 104 may include any device not applicable to the present exemplary embodiment (for example, any device that cannot achieve the recovery check function).

The device 105 may be, for example, a device having the recovery check function as a built-in program. For example, the device management server 104 manages and references device configuration information (type, network information, firmware information, options provided, etc.) to enable identifying a device equivalent to the device 105.

The service providing units 421(1) to 421(N) of the service server 103 are example of functions (services) achieved by the service application, and provides various services. For convenience of description, any one or all of the service providing units 421(1) to 421(N) will be simply referred to as the service providing unit 421. On the other hand, a specific service providing unit 421 will be referred to as the service providing unit 421(A), the service providing unit 421 (B), or the like.

If a failure occurs while the service providing unit 421 is performing processing requested by the device 105, an error processing unit 422 of the service server 103 performs processing for returning an error code and/or an error message to the device 105 to notify it of the occurrence of the failure.

Figure 8:
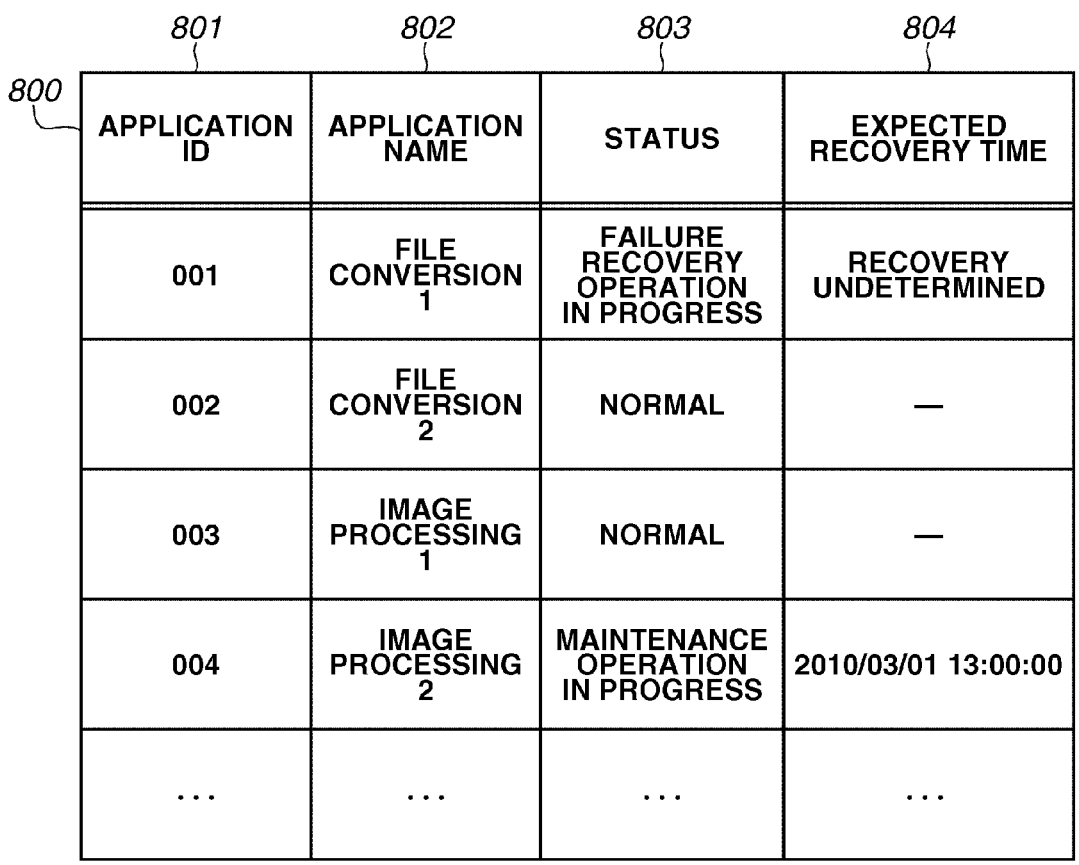
FIG. 8 illustrates an exemplary configuration of a table.

A recovery time management unit 423 of the service server 103 manages information about an expected recovery time of service provision (application service provision) by the service providing unit 421 based on, for example, a status management table 800 illustrated in FIG. 8. For example, if a failure occurs while the service providing unit 421 is performing processing requested by the device 105 and subsequent processing becomes impossible to be performed, an administrator of the service server 103 performs a recovery operation.

Application service provision may be stopped not only by a failure but also by a periodical maintenance operation. In this case, if the expected recovery time is known in advance when the recovery operation and maintenance is performed, the administrator can set information about a recovery schedule to the status management table 800 illustrated in FIG. 8 by operating the keyboard 211.

When receiving a processing request from the device 105, an authentication processing unit 424 of the service server 103 performs authentication processing to check whether a user of the device 105 is allowed to use the application service. The transmitting and receiving unit 425 communicates with, for example, the device management server 104 and the device 105 via the Internet 102.

Figure 5:
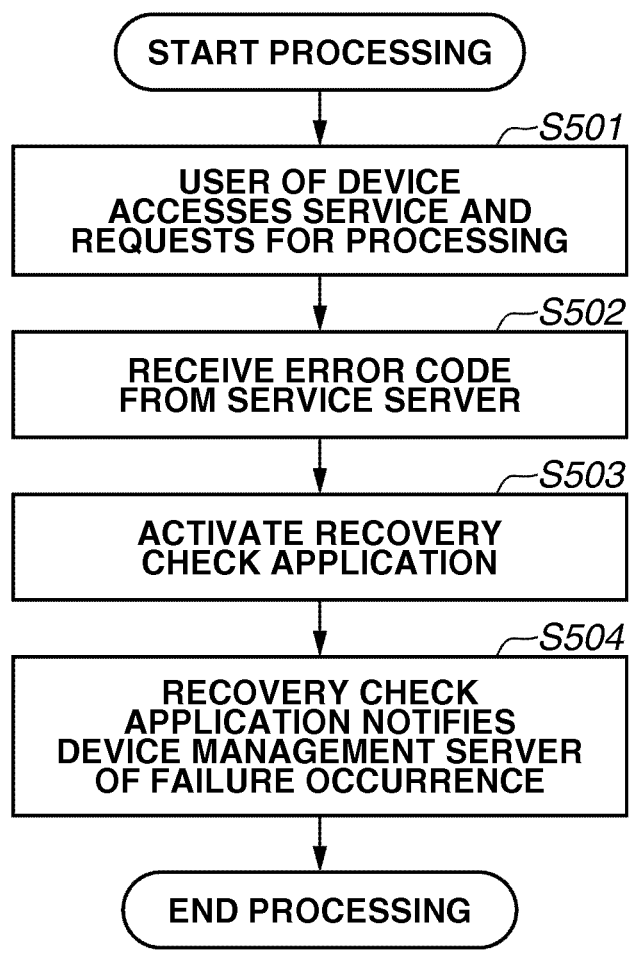
FIG. 5 illustrates an exemplary flow chart of processing performed at the time of failure occurrence.

FIG. 5 is an exemplary flow chart illustrating processing performed by the device 105 if a failure occurs. The processing will be described based on a case where the device 105(X) requests the service providing unit 421(A) to perform processing and then a failure occurs in the service providing unit 421(A). As a first informer, the device 105(X) notifies the device management server 104 of the failure occurrence in the service providing unit 421(A).

In step S501, the device 105(X) responds to a user operation by a user, and accesses the service providing unit 421(A) via the transmitting and receiving unit 414. For example, the device 105(X) requests the service providing unit 421(A) to perform such processing that cannot be performed by the device 105(X) itself.

In step S502, if a failure occurs in the service providing unit 421(A), the device 105(X) receives an error code from the service server 103 via the transmitting and receiving unit 414. The error code is an example of information about a reason why the service providing unit 421(A) stopped processing. The error code can be used to identify the type of a failure occurring in the service providing unit 421(A). By understanding the error code, the user of the device 105(X) can recognize that the requested processing has not been normally completed. There are some types of failures. One type of failure is caused by incorrect data setting by the user of the device 105(X) and can be resolved simply by correcting the data setting. Another type of failure can be solved only when the administrator of the service server 103 performs a certain operation.

In step S503, the device 105(X) activates the recovery check application (activates the recovery check unit 413). More specifically, when the device 105(X) determines that the device 105 cannot avoid the failure, i.e., the administrator of the service server 103 needs to perform a recovery operation, the processing proceeds to step S503. When the device 105(X) determines based on the error code that the recovery operation by the administrator is not required, for example, if an error occurs because of incorrect settings by the user, the device 105(X) displays a message for prompting the user to reset information, and the processing ends.

In step S504, the recovery check unit 413 notifies the device management server 104 of the failure occurrence in the service providing unit 421(A) (failure occurrence notification) via the transmitting and receiving unit 414. Upon reception of the failure occurrence notification, the device management server 104 starts processing for monitoring the status of processing in the service providing unit 421(A) via the service monitoring unit 403.

In this way, the device 105(X) detects the failure in the service providing unit 421(A) of the service server 103, activates the recovery check application, and transmits the failure occurrence notification to the device management server 104.

Figure 6:
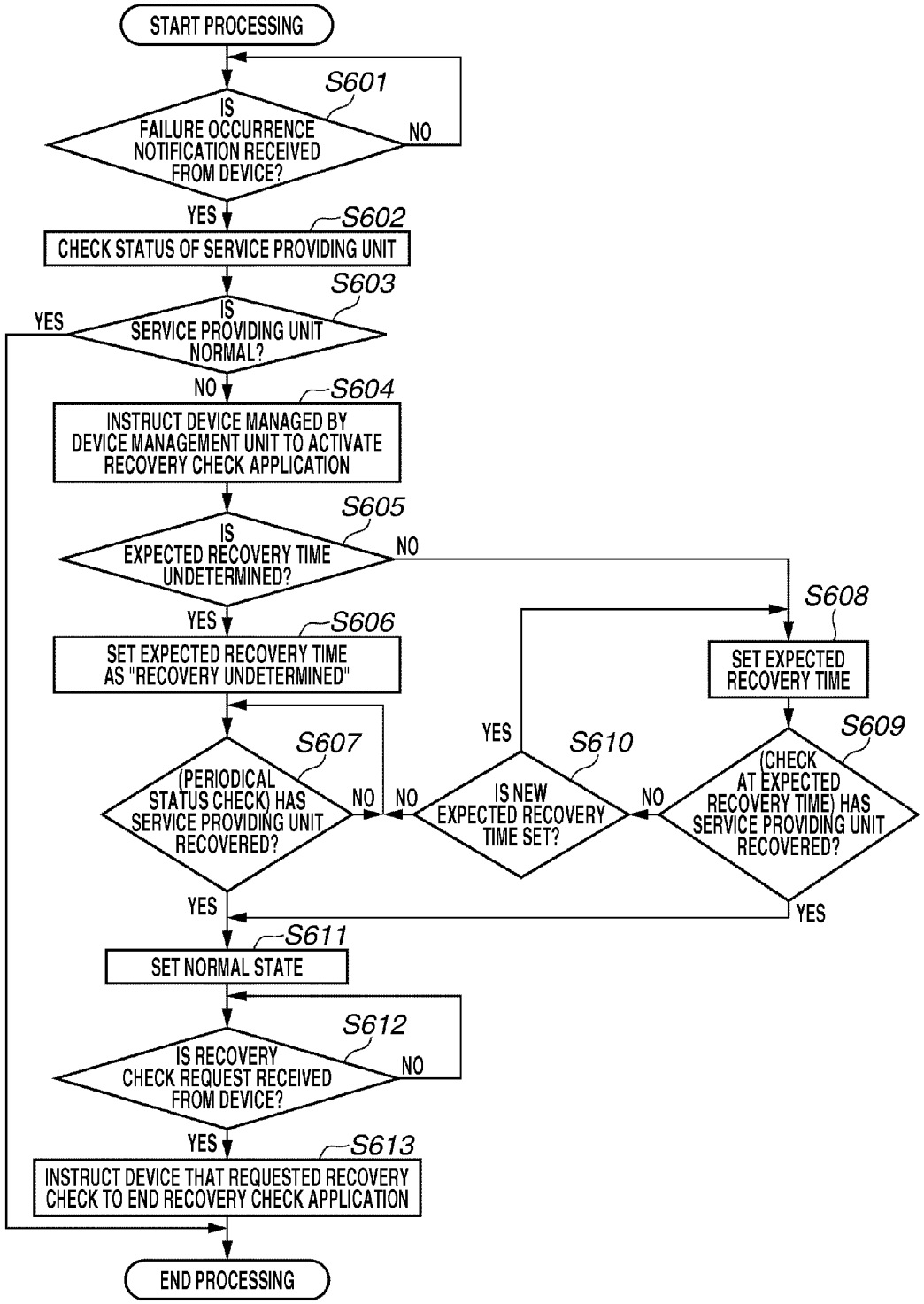
FIG. 6 is an exemplary flow chart illustrating monitoring processing.

FIG. 6 illustrates an exemplary flow chart illustrating monitoring processing by the device management server 104. The monitoring processing illustrated in FIG. 6 is performed by the device management server 104 since it receives from the device 105(X) the notification about the failure occurrence in the service providing unit 421(A) in step S504 until the service providing unit 421(A) recovers from the failure.

In step S601, the device management server 104 determines whether it receives from the device 105(X) the notification about the failure occurrence (failure occurrence notification) in the service providing unit 421(A). When the device management server 104 determines that it receives the notification about the failure occurrence in the service providing unit 421(A) (YES in step S601), the processing proceeds to step S602. On the other hand, when the device management server 104 determines that it does not receive the notification about the failure occurrence in the service providing unit 421(A) (NO in step S601), the processing in step S601 is repeated.

In step S602, the device management server 104 checks the status of the service providing unit 421(A) via the service monitoring unit 403. The status of the service providing unit 421(A) is managed by the service server 103 based on the status management table 800 illustrated in FIG. 8.

In step S603, the device management server 104 determines whether the service providing unit 421(A) is normally operating (normal state) based on a status (check result) returned from the service server 103. When the device management server 104 determines that the service providing unit 421(A) is normally operating (YES in step S603), the service providing unit 421(A) has no problem and then the processing ends. In this case, it can be assumed that the service providing unit 421(A) has recovered from the failure between the time when the device management server 104 receives the failure occurrence notification from the device 105(X) and the time when it checks the status of the service providing unit 421(A) in step S602.

On the other hand, when the device management server 104 determines that the service providing unit 421(A) is not normally operating (in a stopped state, such as a failure state and a maintenance state, in which processing is stopped) (NO in step S603), the processing proceeds to step S604. In this case, the device management server 104 also acquires from the service server 103 an expected recovery time at which the service providing unit 421(A) is expected to recover from the failure in step S602, in preparation for processing in step S605 described below.

In step S604, the device management server 104 instructs, via the application control unit 402, the device 105 under the management of the device management unit 401 to activate the recovery check application in the device 105.

In step S605, the device management server 104 determines whether it could acquire the expected recovery time in step S602. When the device management server 104 determines that it could not acquire the expected recovery time (YES in step S605), the processing proceeds to step S606 since the expected recovery time is undetermined. On the other hand, when the device management server 104 determines that it could acquire the expected recovery time (NO in step S605), the processing proceeds to step S608.

In step S606, the device management server 104 manages the expected recovery time as undetermined in a status management table 900 illustrated in FIG. 9, and the processing proceeds to step S607.

In step S607, the device management server 104 determines whether the service providing unit 421(A) has recovered from the failure as a result of periodical status check via the service server 103. Since the device management server 104 determines that the expected recovery time is undetermined (YES in step S605), the device management server 104 checks the status of the service providing unit 421(A) at certain fixed intervals. When the device management server 104 determines that the service providing unit 421(A) has recovered from the failure (YES in step S607), the processing proceeds to step S611. On the other hand, when the device management server 104 determines that the service providing unit 421(A) has not recovered from the failure (NO in step S607), the processing repeats step S607.

In step S608, the device management server 104 sets the expected recovery time acquired from the service server 103 to the status management table 900 illustrated in FIG. 9, and manages the expected recovery time.

In step S609, the device management server 104 determines whether the service providing unit 421(A) has recovered from the failure as a result of status check via the service server 103 at the expected recovery time. When the device management server 104 determines that the service providing unit 421(A) has recovered from the failure (YES in step S609), the processing proceeds to step S611. On the other hand, if the device management server 104 determines that the service providing unit 421(A) has not recovered from the failure (NO in step S609), the processing proceeds to step S610.

In step S610, the device management server 104 determines whether the expected recovery time has been changed via the service server 103. When the device management server 104 determines that a new expected recovery time is set (YES in step S610), the processing proceeds to step S608. In step S608, the device management server 104 sets the new expected recovery time to the status management table 900. On the other hand, when the device management server 104 determines that a new expected recovery time is not set (NO in step S610), the processing proceeds to step S607.

In step S611, since the service providing unit 421(A) has recovered to the normal state, the device management server 104 sets a status indicating the normal state to the status management table 900.

In step S612, the device management server 104 determines whether it receives from the recovery check unit 413 of the device 105(X) an inquiry (recovery check request) for inquiring for whether the service providing unit 421(A) has recovered from the failure. When the device management server 104 determines that it receives the inquiry from the device 105(X) (YES in step S612), the processing proceeds to step S613. In this case, the device management server 104 determines that the device 105(X) has attempted to request the service providing unit 421(A) to perform processing. When the device management server 104 determines that it does not receive an inquiry from the device 105(X) (NO in step S612), the device management server 104 waits for an inquiry therefrom. In this case, the device management server 104 determines that the device 105(X) has not requested the service providing unit 421(A) to perform processing.

In step S613, since the service providing unit 421(A) has recovered from the failure, the device management server 104 instructs the device 105(X) via the application control unit 402 to close the recovery check application. In response to the instruction, the device 105(X) closes the recovery check application and allows access to the service providing unit 421(A). The devices 105 other than the device 105(X) remains a state in which access to the service providing unit 421(A) is not allowed. The devices 105 other than the device 105(X) can access the service providing unit 421(A) in certain situations when the device 105 attempts to access the service providing unit 421(A) (for example, refer to FIG. 7).

Figure 7:
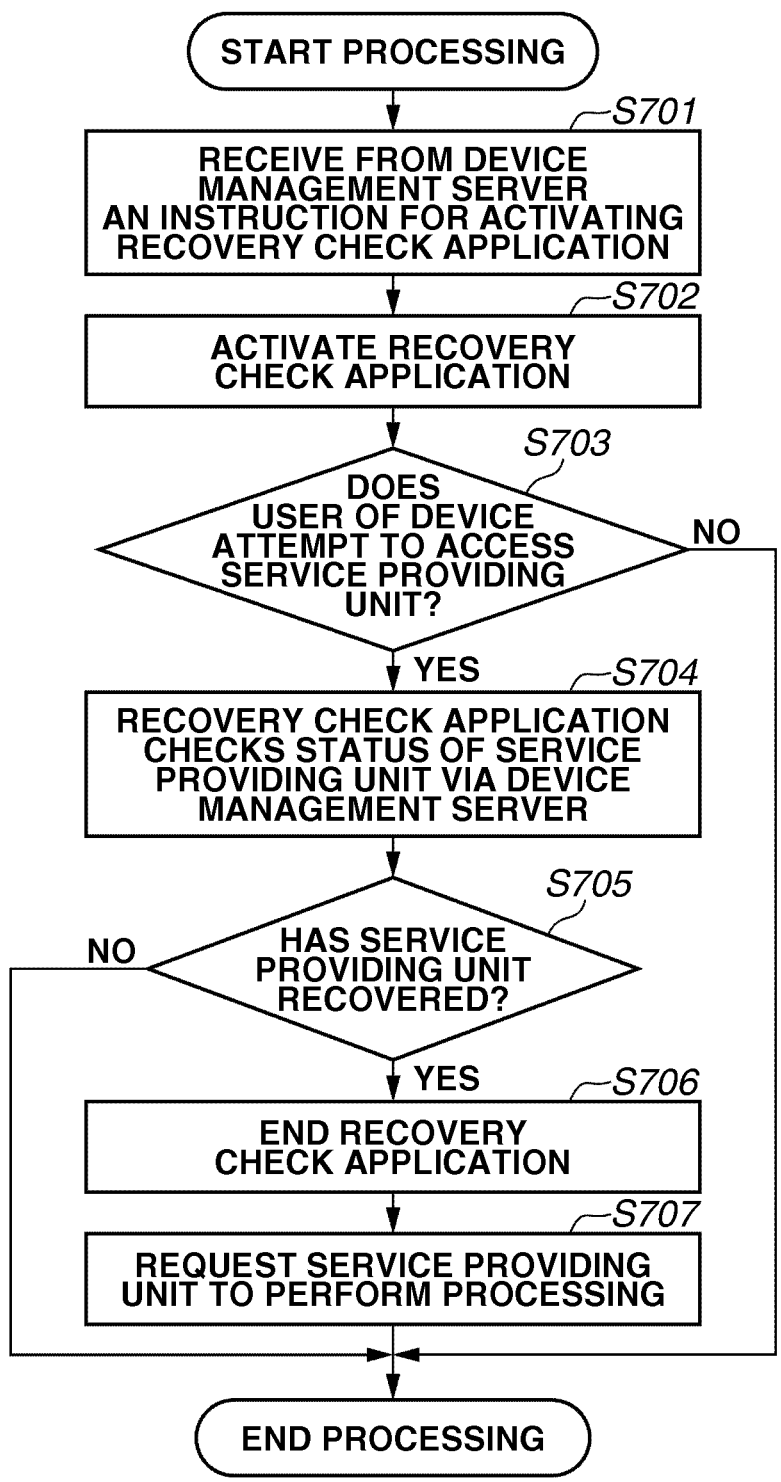
FIG. 7 is an exemplary flow chart illustrating recovery check application control processing.

FIG. 7 is an exemplary flow chart illustrating processing since the device management server 104 instructs the device 105(Y) other than the device 105(X) to activate the recovery check application until the device 105(Y) closes the recovery check application (recovery check application control processing).

In step S701, the device 105(Y) receives from the device management server 104 an activation instruction to activate the recovery check application.

In step S702, following the activation instruction from the device management server 104, the device 105(Y) activates the recovery check application (causes the recovery check unit 413 to function).

In step S703, the recovery check unit 413 of the device 105(Y) determines whether the user of the device 105(Y) requests the service server 103 via an input apparatus such as the keyboard 311 to perform such processing that cannot be performed by the device 105(Y). In other words, the recovery check unit 413 of the device 105(Y) determines whether the user of the device 105(Y) attempts to access the service providing unit 421(A). When the recovery check unit 413 determines that the user of the device 105(Y) attempts to access the service providing unit 421(A) (YES in step S703), the processing proceeds to step S704.

On the other hand, when the recovery check unit 413 determines that the user of the device 105(Y) does not attempt to access the service providing unit 421(A) (NO in step S703), the processing ends. Thus, access to the service providing unit 421(A) which is not available by the failure is limited, and useless communication to the Internet 102 is no longer performed.

In step S704, the recovery check unit 413 of the device 105(Y) requests the device management server 104 to acquire the status of the service providing unit 421(A).

In step S705, upon reception of the status of the service providing unit 421(A) from the device management server 104, the recovery check unit 413 determines whether the service providing unit 421(A) has recovered from the failure (more specifically, whether the service providing unit 421 is in the stopped state). When the recovery check unit 413 determines that the service providing unit 421(A) has recovered from the failure (YES in step S705), the processing proceeds to step S706.

On the other hand, when the recovery check unit 413 determines that the service providing unit 421(A) has not recovered from the failure (NO in step S705), the device 105(Y) notifies the user of the device 105(Y) of the fact that the service providing unit 421(A) is not available. The device 105(Y) does not permit the user to access the service providing unit 421(A). Then, the processing ends.

In step S706, since the service providing unit 421(A) has recovered from the failure, the device 105(Y) closes the recovery check application.

In step S707, since the user of the device 105(Y) is attempting to access the service providing unit 421(A), the device 105(Y) requests the service providing unit 421(A) that has recovered from the failure to perform processing. Thus, the device 105(Y) can normally access the service providing unit 421(A) that has recovered from the failure.

FIG. 8 illustrates an exemplary configuration of the status management table 800 for storing information about the service providing unit 421 under the management of the recovery time management unit 423 of the service server 103.

The status management table 800 stores one record for each service application (service providing unit 421) operating on the service server 103. The record includes such information as the current state of the service providing unit 421 and, when it is in the failure state, the expected recovery time. The status management table 800 shown in FIG. 8 stores an application identifier (ID) 801, an application name 802, a status 803, and the expected recovery time 804. However, the information stored in the status management table 800 is not limited thereto since it may depend on the configuration of the failure monitoring system.

When the service server 103 includes a plurality of application services, the application ID 801 is a unique value which can identify each individual service application. The application name 802 indicates the name of each service application. The status 803 indicates the status of each service application. The device management server 104 can determine whether the service providing unit 421 is normally operating and what state the service providing unit 421 is currently in if it is stopped by acquiring the information in the status 803. The expected recovery time 804 indicates an expected recovery time of the service providing unit 421 when the service providing unit 421 is not normally operating. For example, if the expected recovery time is undetermined, "RECOVERY UNDETERMINED" is set.

FIG. 9 illustrates an exemplary configuration of the status management table 900 storing information about the service providing unit 421 monitored by the service monitoring unit 403 of the device management server 104.

The status management table 900 stores one record for each service application (service providing unit 421) of the service server 103 under the management of the device management server 104. The status management table 900 stores information acquired from the status management table 800. The information includes, for example, the current state of the service providing unit 421 and, if it is in the failure state, the expected recovery time. The status management table 900 stores information such as a service server ID 901, an application ID 902, an application name 903, a status 904, an expected recovery time 905, a uniform resource locator (URL) 906, an authentication ID 907, and a password 908. These pieces of information may depend on the configuration of the failure monitoring system and therefore not limited thereto.

When a plurality of service servers 103 exists on the Internet 102, the service server ID 901 is a unique value which can identify each individual service server 103. The information of the application ID 902 is similar to that of the application ID 801. When the plurality of service servers 103 including a plurality of service applications exists on the Internet 102, the device management server 104 uniquely identifies each individual service application with a combination of the service server ID 901 and the application ID 902. The information of the application name 903 is similar to that of the application name 802.

The information of the status 904 is similar to that of the status 803. The recovery check unit 413 of the device 105 can determine whether the service providing unit 421 is normally operating and what state the service providing unit 421 is currently in if it is stopped by checking the status 904. The information of the expected recovery time 905 is similar to that of the expected recovery time 804. The URL 906 indicates URL information for checking the status of the service providing unit 421 of the service server 103. The URL information is used, for example, when a request for executing an application for acquiring information of the status management table 800 in the service server 103 is transmitted in advance to the service server 103. The authentication ID 907 and the password 908 are used when it is necessary to perform authentication processing for the service server 103 to acquire information of the status management table 800.

FIG. 10 illustrates an exemplary configuration of the device management table 1000 storing information about the device 105 under the management of the device management unit 401 of the device management server 104.

The device management table 1000 stores one record for each individual device 105 under the management of the device management server 104. The record includes such information as the current state and a location site of the device 105 and whether the recovery check unit 413 is currently operating. The device management table 1000 stores a device ID 1001, a model name 1002, a usability status 1003, an installation site 1004, and a recovery check application status 1005. These pieces of information may depend on the configuration of the failure monitoring system and are therefore not limited thereto.

The device ID 1001 is a unique value which can identify each individual device 105 on the LAN 101 under the management of the device management server 104. The model name 1002 indicates a model name of the device 105 under the management of the device management server 104. The usability status 1003 indicates whether the device 105 is in the on-line state, the usable state, or the like. The installation site 1004 indicates where the device 105 is physically installed. The recovery check application status 1005 indicates whether the recovery check application of the device 105 is activated, i.e., the recovery check unit 413 is operating.

FIG. 11 illustrates an exemplary flow chart illustrating a series of processing performed among the apparatuses during a time duration since the device 105(X) requests the service server 103 to perform processing and a failure occurs in the service providing unit 421 of the service server 103 until the service providing unit 421 recovers from the failure.

In step S1101, the device 105(X) requests the service providing unit 421 of the service server 103 to perform processing. In step S1101, the device 105(X) requests the service sever 103 to perform such processing that cannot be performed by the device 105(X) itself and processing that can be more efficiently performed by the service providing unit 421 than performed by the device 105(X).

In step S1102, upon reception of the processing request from the device 105(X), the service providing unit 421 of the service server 103 performs the requested processing. In step S1103, the service server 103 returns a result of the processing performed in step S1102 to the device 105(X). In this example, a failure occurs in the processing in step S1102, and the service server 103 returns a notification about the failure occurrence in the service provision unit 421, such as an error code. When the service providing unit 421 normally completes processing, the service server 103 returns a result of the processing to the device 105(X).

In step S1104, the device 105(X) activates the recovery check application managed by the device 105(X) itself. In step S1105, when the recovery check application is activated, the recovery check unit 413 of the device 105 operates and notifies the device management server 104 of the failure occurrence in the service providing unit 421 (failure occurrence notification).

In step S1106, upon reception of the failure occurrence notification from the device 105(X) via the transmitting and receiving unit 404, the service monitoring unit 403 checks the status of the service providing unit 421 of the service server 103. In step S1107, the service server 103 returns a result of status check processing to the device management server 104. In step S1108, the device management server 104 stores the returned status of the service providing unit 421 in the status management table 900.

In step S1109, the device management server 104 acquires from the recovery check status 1005 of the device management table 1000 information about the device 105 other than the device 105(X), whose recovery check application is not activated, and identifies the device 105(Y). Then, the device management server 104 instructs the identified device 105(Y) to activate the recovery check application. Thus, the recovery check application of all of the devices 105 under the management of the device management server 104 can be activated. In step S1110, the device 105(Y) activates the recovery check application.

In step S1111, while the service providing unit 421 is in the failure state, the device management server 104 inquires of the service server 103 for whether the service providing unit 421 has recovered from the failure (checks the status) periodically or when the expected recovery time comes. In step S1112, the service server 103 returns a result (status) of the inquiry to the device management server 104.

When the service providing unit 421 has not recovered from the failure, the device 105 performs processing in steps S1113 and S1114. Although FIG. 11 illustrates that the processing in steps S1113 and S1114 is performed only by the device 105(X) for convenience of description, the processing may be performed not only by the device 105(X) but also by any device 105.

In step S1113, when the device 105(X) attempts to request the service providing unit 421 to perform processing, the recovery check unit 413 inquires of the device management server 104 for whether the service providing unit 421 has recovered from the failure (checks the status). In step S1114, the device management server 104 returns the status of the service providing unit 421 to the recovery check unit 413 of the device 105(X). In this example, since information of the status 904 is "FAILURE RECOVERY OPERATION IN PROGRESS", the device management server 104 returns the status "FAILURE RECOVERY OPERATION IN PROGRESS" indicating that the service providing unit 421 is in the failure state.

When the service providing unit 421 has recovered from the failure, the device 105 performs processing in steps S1115 to S1120. Although FIG. 11 illustrates that the processing in steps S1115 to S1120 is performed only by the device 105(X) for convenience of description, the processing may be performed not only by the device 105(X) but also by any device 105.

In step S1115, when the device 105(X) attempts to request the service providing unit 421 to perform processing, the recovery check unit 413 inquires of the device management server 104 for whether the service providing unit 421 has recovered from the failure (checks the status). In step S1116, the device management server 104 returns the status of the service providing unit 421 to the recovery check unit 413 of the device 105(X). In this example, since information of the status 904 is "NORMAL", the device management server 104 returns the status "NORMAL" indicating that the service providing unit 421 has recovered from the failure. In step S1117, since the service providing unit 421 has recovered from the failure, the device 105(X) terminates the recovery check unit 413.

In step S1118, since termination of the recovery check unit 413 enables the device 105(X) to access the service providing unit 421, the device 105(X) requests the service providing unit 421 of the service server 103 to perform processing. In step S1119, the service providing unit 421 performs the processing requested by the device 105(X). In step S1120, the service server 103 returns a result of the processing to the device 105(X).

Generally, there is a fire wall between the device 105 in the LAN 101 and the service providing unit 421 on the Internet 102. Therefore, the device 105 cannot recognize that the service providing unit 421 has recovered from the failure unless the device 105 inquires of the service providing unit 421.

However, the device 105 according to the present exemplary embodiment includes the recovery check application which checks the status of the service providing unit 421 via the device management server 104 on the LAN 101. Therefore, the device 105 can check the status of the service providing unit 421 without directly accessing the service providing unit 421, and recognize that the service providing unit 421 has recovered from the failure.

The first exemplary embodiment is specifically described based on a case where the device 105(X) detects a failure in the service providing unit 421 and notifies the device management server 104 of the failure occurrence in the service providing unit 421. A second exemplary embodiment will be described below based on a case where the device management server 104 periodically checks the status of the service providing unit 421 to detect a failure in the service providing unit 421.

More specifically, the second exemplary embodiment differs from the first exemplary embodiment mainly in that the device management server 104 performs the processing in step S1106 and subsequent steps, and periodically performs the processing in steps S1106 and S1107, without receiving the failure occurrence notification from the device 105(X) in step S1105 in FIG. 11.

With this configuration, the device management server 104 can instruct the device 105 to activate the recovery check application when the device management server 104 itself notices a failure in the service providing unit 421, without receiving the failure occurrence notification from the device 105. In addition, when the device management server 104 detects a failure in the service providing unit 421 and determines that the failure requires a recovery operation by the administrator, the device management server 104 can instruct the device 105 to activate the recovery check application. The present invention is not limited to the first and second exemplary embodiments but may be based on a combination thereof.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-119626 filed May 25, 2010, which is hereby incorporated by reference herein in its entirety.

What is claimed is:

1. An image processing apparatus capable of requesting a service providing apparatus via an external network to perform processing provided by the service providing apparatus, the image processing apparatus comprising:
an activation unit configured to activate a check unit configured to check a status of the processing acquired by an information processing apparatus communicating with the image processing apparatus via an internal network;
a stopping unit configured to stop the check unit if the check unit activated by the activation unit recognizes that the status of the processing is not a stopped state; and
a request unit configured to request the service providing apparatus to perform the processing if the check unit is stopped.

2. The image processing apparatus according to claim 1, wherein the activation unit is configured to determine whether the processing performed by the service providing apparatus is stopped or not and to activate the check unit if it is determined that the processing is stopped based on a notification about stoppage of the processing from the service providing apparatus.

3. The image processing apparatus according to claim 2, wherein the activation unit is further configured to determine whether the processing can be performed or not if a setting of the processing is changed and to activate the check unit if it is determined that the processing is not performed, based on information about a reason why the processing is stopped included in the notification.

4. The image processing apparatus according to claim 1, wherein the activation unit is configured to determine whether the processing performed by the service providing apparatus is stopped or not and to activate the check unit if it is determined that the processing is stopped based on a notification about stoppage of the processing from the information processing apparatus, the information processing apparatus having acquired the status of the processing from the service providing apparatus and recognized that the processing is stopped.

5. A method for controlling communication in an image processing apparatus capable of requesting a service providing apparatus via an external network to perform processing and capable of communicating with an information processing apparatus via an internal network, the image processing apparatus comprising a check unit configured to check a status of the processing acquired by the information processing apparatus, the method comprising:
activating the check unit;
stopping the check unit if the activated check unit recognizes that the status of the processing is not a stopped state; and
requesting the service providing apparatus to perform the processing if the check unit is stopped.

6. A computer readable storage medium storing a program which, when run on a device, causes the device to perform the method as claimed in claim 5.

7. An information processing apparatus for communicating with a plurality of image processing apparatuses via an internal network and for communicating with a service providing apparatus via an external network, the service providing apparatus configured to perform processing requested by at least one of the plurality of image processing apparatuses via the external network, the information processing apparatus comprising:
an acquisition unit configured to acquire a status of the processing from the service providing apparatus;
a notification unit configured to transmit, in a case where it is determined that the processing provided by the service providing apparatus is stopped, a notification to at least one of the plurality of image processing apparatuses that the processing is stopped such that a check unit configured to check the status of the processing acquired by the information processing apparatus is activated; and
a reply unit configured to return, if the activated check unit of any one of the plurality of image processing apparatuses requests to check the status of the processing, information about the status of the processing acquired by the acquisition unit to the requesting image processing apparatus.

8. The information processing apparatus according to claim 7, wherein the notification unit configured to transmit, if it is determined that the processing is stopped based on a notification about stoppage of the processing from one of the plurality of image processing apparatuses, said image processing apparatus having received a notification about stoppage of the processing from the service providing apparatus, the notification to at least one of the other image processing apparatuses.

9. The information processing apparatus according to claim 8, wherein the acquisition unit is configured to acquire a status of the processing periodically, and, the notification unit configured to transmit, if it is determined that the processing is stopped as a result of periodically checking the status of the processing provided by the service providing apparatus, the notification to the plurality of image processing apparatuses that the processing is stopped.

10. A method for controlling communication in an information processing apparatus for communicating with a plurality of image processing apparatuses via an internal network and for communicating with a service providing apparatus via an external network, the service providing apparatus configured to perform processing requested by at least one of the plurality of image processing apparatuses via the external network, the method comprising the steps of:
   acquiring a status of the processing from the service providing apparatus;
   transmitting, in a case where it is determined that the processing provided by the service providing apparatus is stopped, a notification to at least one of the plurality of image processing apparatuses that the processing is stopped such that a check unit configured to check the status of the processing acquired by the information processing apparatus is activated; and
   returning, if the activated check unit of any one of the plurality of image processing apparatuses requests to check the status of the processing, information about the acquired status of the processing to the requesting image processing apparatus.

11. A computer readable storage medium storing a program which, when run on a device, causes the device to perform the method as claimed in claim 10.

12. A communication control system comprising:
   a plurality of image processing apparatuses capable of requesting a service providing apparatus via an external network to perform processing provided by the service providing apparatus, wherein each of the plurality of image processing apparatuses comprises:
   an activation unit configured to activate a check unit configured to check a status of the processing acquired by an information processing apparatus communicating with the image processing apparatus via an internal network;
   a stopping unit configured to stop the check unit if the check unit activated by the activation unit recognizes that the status of the processing is not a stopped state; and
   a request unit configured to request the service providing apparatus to perform the processing if the check unit is stopped,
   wherein the information processing apparatus for communicating with the plurality of image processing apparatuses via the internal network and for communicating with the service providing apparatus via the external network, comprises:
   an acquisition unit configured to acquire the status of the processing from the service providing apparatus; and
   a reply unit configured to return, if the check unit of any one of the plurality of image processing apparatuses requests to check the status of the processing, information about the status of the processing acquired by the acquisition unit to the requesting image processing apparatus.

* * * * *